Patented Feb. 10, 1948

2,435,570

UNITED STATES PATENT OFFICE 2,435,570

NITROSYL HALIDE ADDITION PRODUCT OF ALLYL-TYPE OLEFINIC HIGHER HYDROCARBONS

Leland James Beckham, Syracuse, N. Y., assignor to Allied Chemical & Dye Corporation, a corporation of New York No Drawing. Application February 27, 1945, Serial No. 580,071

17 Claims. (Cl. 260—647)

This invention relates to new compositions of matter and to processes for manufacturing the compositions. The compositions are valuable for use as starting materials in processes for the manufacture of products of various types. They are particularly valuable for use as starting materials in the process for the manufacture of the products having surface-active properties which are described in my application Serial No. 221,707, filed July 28, 1938, now United States Patent 2,265,993 issued December 16, 1941.

This application is a continuation-in-part of my copending application Serial No. 421,550, filed December 4, 1941 (now abandoned), which was in turn a continuation-in-part of my aforesaid application Serial No. 221,707, now United States Patent 2,265,993.

In accordance with the process of the invention, the compositions thereof are manufactured from an olefinic hydrocarbon which is characterized by containing at least 12 carbon atoms and preferably 12 to 30 carbon atoms, by having not more than one ring system (such as an alicyclic or benzenoid ring), and by containing one aliphatic

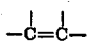

linkage, said

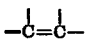

linkage being in an allyl radical (i. e. a radical having the structure $-CH_2-CH=CH_2$). Such olefinic hydrocarbons are hereinafter called "allyl type" hydrocarbons. The compositions of the invention are formed by the action of nitrosyl chloride or nitrosyl bromide on an allyl type hydrocarbon or a mixture of allyl type hydrocarbons of the aforesaid class, under conditions adapted to form (at least initially) a substantial proportion of nitroso halides, i. e. addition products in which a nitroso group and a halogen atom (chlorine or bromine) are attached respectively to the adjacent carbon atoms which formed the aliphatic double bond in the allyl type hydrocarbon or hydrocarbons employed as the starting material. Thus, the compositions of the invention are nitrosyl halide addition products of allyl type hydrocarbons or of mixtures containing such hydrocarbons.

It was known heretofore to prepare nitrosyl chloride addition product of unsaturated hydrocarbons and their derivatives containing a double bond in intermediate position in an aliphatic chain (e. g. in a propenyl radical having the formula: $-CH=CH-CH_3$), or in an alicyclic ring of carbon atoms (e. g. cyclohexene), or in isoolefinic compounds wherein branching of the carbon atom chain occurs at one of the double-bonded carbon atoms (e. g. isobutylene). However, olefinic hydrocarbons containing the aliphatic double bond in an allyl radical were considered incapable of reacting with nitrosyl chloride to form addition products (Tilden et al., Journal of the Chemical Society (London) vol. 65 (1894) page 334). Thus, according to the prior art, it would have been expected that olefinic hydrocarbons containing 12 or more carbon atoms and having the aliphatic

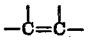

linkage in an allyl radical would not react with nitrosyl chloride or nitrosyl bromide to form addition products.

Allyl type olefinic hydrocarbons of 12 or more carbon atoms are desirable starting materials for the preparation of compositions having a wide variety of uses, e. g. surface-active agents, flotation agents, insecticides, and the like, by processes involving reactions of the aliphatic linkage. Addition of a nitrosyl halide at the double bond of an olefinic hydrocarbon constitutes a convenient method for rendering the hydrocarbon susceptible to further reactions and the resulting addition products are valuable intermediates for the preparation of useful compositions of the type mentioned above.

I have discovered, contrary to the indications of the prior art, that allyl type olefinic hydrocarbons containing at least 12 (and preferably 12 to 30) carbon atoms, and having not more than one ring system, reacts with nitrosyl chloride and with nitrosyl bromide to form addition products.

Moreover, I have discovered that hydrocarbon mixtures containing olefinic hydrocarbons having at least 12, and preferably 12 to 30, carbon atoms, not more than one ring system, and one aliphatic

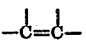

linkage, containing olefinic hydrocarbons of the allyl type together with olefinic hydrocarbons of other types (i. e. containing the aliphatic

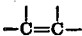

linkage elsewhere in the molecule than in an allyl radical) react with nitrosyl chloride and nitrosyl bromide to form a mixture of the addition products of the allyl type hydrocarbons as well as of the other types of olefins. This is surprising, since in view of the aforesaid indications of the prior art, it would have been expected that upon attempting to convert such a mixture containing olefinic hydrocarbons of various types into nitrosyl halide addition products, the allyl type hydrocarbons would not react at all, or in any case, would react so slowly as compared with the other types of olefinic hydrocarbons that the nitrosyl halide addition products of the latter would undergo destructive secondary reactions as a result of continued contact with the nitrosyl halide, by the time any substantial proportion of the allyl type hydrocarbons would have reacted with the nitrosyl halide to form addition products. Contrary to such expectations, I have found in the case of mixtures of olefinic hydrocarbons containing those of the allyl types, as well as of other types, having at least 12 and preferably 12 to 30 carbon atoms and not more than one ring system, that the various types of olefinic hydrocarbons therein react with nitrosyl halides in a sufficiently uniform manner that such mixtures can be economically converted in good yields to mixtures of addition products of all of the aforesaid types of olefinic hydrocarbons without substantial contamination of the addition products by destructive side reactions.

Hydrocarbons that can be used as starting material in the present process may be compounds that occur naturally or compounds prepared by a variety of different processes. As indicated above, the preferred hydrocarbons are those containing 12 to 30 carbon atoms. It is further preferred to employ hydrocarbons which contain at least 8 carbon atoms in a straight chain, four of the six carbon atoms contained in a six-membered ring being considered as part of a chain. Thus, 7-phenyl-heptene-1 is considered as having 11 carbon atoms in a straight chain. While hydrocarbons containing a ring system are adapted for use in the present process, it has been found that more valuable products are obtained from acyclic hydrocarbons.

A number of types of hydrocarbons can be employed for the production of the compositions of the invention. Thus there may be used open chain acyclic olefins having the empirical formula $C_nH_{2n}$, wherein $n$ is at least 12 and preferably 12 to 30, including normal or branched chain acyclic olefins having the double bond in terminal position in an allyl radical. As examples of the first group of olefins, there may be mentioned the normal terminal double bond olefins from dodecene-1 to triacontene-1. Research carried out during the development of the present invention indicated that the most important member of this group from an economic and technical viewpoint is cetene-1, which is obtainable readily by destructive distillation of spermaceti. Valuable allyl type olefins are obtainable also by destructive distillation of other waxes such as, for example, carnauba wax and Chinese insect wax. The even-numbered members of this group from $C_{12}$ through $C_{18}$ may be obtained by dehydration of the alcohols made by reduction of natural oils of vegetal origin such as, for example coconut oil, palm oil, babassu nut oil, and tallow, either directly or by first preparing the free acids, or esters thereof, and then reducing the acids or esters. These even-numbered olefins are dodecene-1, tetradecene-1, cetene-1, and octadecene-1. Various branched-chain olefins of the allyl type are also known, e. g. 11-methyl dodecene-1. These branched-chain acyclic olefins are generally of lesser importance from an economic standpoint than the normal-chain compounds because they are not yet readily available commercially in a form unmixed with substantial proportions of other hydrocarbons. These branched-chain compounds, however, occur along with other unsaturated hydrocarbons in unsaturated petroleum hydrocarbons.

Olefins containing one alicyclic ring system also are of interest as starting materials for the present process. While these olefins are not commercially available in pure form at the present time, they likewise form a part of some processed petroleum fractions. Illustrative of these allyl type olefins are 10-cyclohexyl-decene-1 and 5-ethyl-7-cyclopentyl-heptene-1.

The compositions of the invention can also be prepared from petroleum fractions and from hydrocarbon mixtures of the type of a petroleum distillate containing allyl type olefins of at least 12 and preferably from 12 to 30 carbon atoms. Petroleum type fractions having substantially the aforesaid range of carbon atoms are those which boil above 200° C. at atmospheric pressure. The preferred fractions are those which have lower boiling points above 200° C. at atmospheric pressure and upper boiling points below 300° C. at 10 mm. mercury pressure. It will be understood that these limits include fractions which boil over narrow ranges within the aforesaid limits.

Petroleum type fractions containing allyl type hydrocarbons may be prepared in different ways. Such fractions can be obtained for example from paraffinic petroleum fractions, e. g., paraffin wax, paraffin oil or reduced paraffin base crude oil (i. e. a crude oil from which all of the gasoline and kerosene and part of the gas oil have been removed by distillation), by simple thermolytic cracking process under relatively mild conditions of temperature, pressure and duration of treatment so as to minimize secondary reactions. The unsaturated hydrocarbons formed by simple cracking are said to be mostly straight chain mono-olefins and also are said to contain the double bond in a terminal position. Straight chain hydrocarbons with a double bond in the terminal position contain the allyl group.

Moreover, synthetic hydrocarbon mixtures obtained by catalytic hydrogenation of carbon oxides (i. e. the Fischer-Tropsch synthesis) are composed almost entirely of unbranched hydrocarbons, and the olefins contained therein comprise large amounts of unbranched alpha olefins, the amounts of iso-olefins being negligible, if present at all. Thus, olefinic hydrocarbon mixtures having a boiling range within the limits set forth above, obtained by hydrogenation of carbon oxides, or by simple thermolytic cracking of the paraffins obtained thereby, contain large proportions of normal terminal double bond olefins and are suitable for the preparation of the nitrosyl halide addition products of allyl type olefinic hydrocarbons of this invention.

The presence of olefins other than those of the allyl type in hydrocarbon mixtures obtained by thermolytic cracking or by the Fischer-Tropsch synthesis do not interfere with the reaction of the allyl type olefins with nitrosyl chloride or nitrosyl bromide to form addition products but react in similar manner to form nitrosyl halide addition products. Neither catalytic dehydrogenation, nor successive chlorination and dehydrochlorination of hydrocarbon mixtures is suitable for preparation of olefinic hydrocarbon mixtures containing substantial proportion of allyl type olefins. Accordingly, these methods are unsuited for preparing starting materials for the process of the invention.

As already stated, the present process is carried out by reacting the desired hydrocarbon or mixture of hydrocarbons with nitrosyl chloride or nitrosyl bromide under conditions adapted to form the corresponding nitroso halides of the allyl type olefins contained therein. This reaction can be carried out conveniently by adding to the allyl type hydrocarbon, or mixture of hydrocarbons such as those mentioned above, sufficient nitrosyl halide to convert the olefinic hydrocarbon or hydrocarbons to addition products. The amount of nitrosyl halide employed in a particular case depends principally upon the hydrocarbon or hydrocarbons used and the conditions of operation (such as the temperature, whether the operation is a batch or continuous operation, etc.) Thus, under some conditions it may be desirable to convert substantially all (70 to 100 per cent) of the olefinic hydrocarbons to addition products, while under other conditions it might be found preferable to convert only relatively smaller proportions of the aforesaid hydrocarbons to such products. The extent to which the reaction of the nitrosyl halide is carried out depends, accordingly upon the result desired. Two general sets of reactions may take place: first, the desired addition of the nitrosyl halide to the unsaturated hydrocarbon or hydrocarbons; and second, the undesired destructive action of the nitrosyl halide on the addition products. Where a complex mixture of hydrocarbons is employed, such as a mixture derived from a mineral source, the maximum extent to which the reaction is carried out is such as not substantially to exceed the point at which the amount of combined halogen in the addition product is equal to two atoms of halogen per molecule of initially unsaturated hydrocarbon or mixture thereof subjected to treatment. Preferably the extent of treatment is such that the amount of combined halogen in the addition product lies between 1 and 2 halogen atoms per molecule of initially unsaturated hydrocarbon or mixture thereof subjected to treatment. In general, the amount of nitrosyl halide used should not be materially less than ½ mol for each mol of reactive hydrocarbon; where maximum conversion of the olefinic hydrocarbon is desired, two or more mols may be used. Under normal conditions of operation, when a substantially pure allyl type olefin is used, it is generally satisfactory to employ one to two mols of the nitrosyl halide for each mol of olefinic hydrocarbon. On the other hand, where a complex mixture of olefinic hydrocarbons is employed, such as a petroleum fraction, it is generally preferred to use 2 to 4 mols of the nitrosyl halide for each mol of olefinic hydrocarbon in the mixture.

The nitrosyl halide can be introduced into the hydrocarbon or mixture of hydrocarbons as a gas or a liquid or, in cases where a solvent is employed, in solution in the solvent. Also the nitrosyl halide may be formed in situ; for example, nitrosyl chloride may be formed in situ by the action of isoamyl nitrite and hydrochloric acid.

The reaction can be carried out at temperatures varying over wide limits provided an important amount of nitroso halides is formed. For example, temperatures varying from −20° to 80° C. are suitable for the reaction of nitrosyl chloride with the hydrocarbons, temperatures not exceeding 40° C. being preferred; and temperatures not exceeding 10° C. are suitable for the reaction of nitrosyl bromide with the hydrocarbons. Also the pressures may be varied; partial pressures varying from 0.02 to 2 atmospheres of nitrosyl chloride and from 0.02 to 1 atmosphere of nitrosyl bromide being suitable. Since ordinary atmospheric temperatures and pressures are satisfactory, the reaction is conveniently carried out under these conditions.

The time necessary to complete the reaction depends upon the specific solvent, temperature, concentration, and other conditions employed, but in general varies from 1 to 24 hours. After the formation of the addition product has been completed, the solvent, if used, and the excess nitrosyl halide are removed by evaporation, preferably at as low a temperature as convenient; in any case, not above 80° C., vacuum vaporization being employed if necessary. The excess nitrosyl halide can also be removed by blowing dry air or an inert gas, such as nitrogen, through the mixture.

The conditions discussed above are representative of conditions adapted to convert the reactive hydrocarbons to nitroso halides and thereby form addition products between the hydrocarbons and the nitrosyl chloride or nitrosyl bromide. In using nitrosyl chloride, for example, the formation of the addition products is indicated by the appearance in the reaction mixture of the blue or green color characteristic of nitroso chlorides. While the addition products prepared from nitrosyl chloride at least initially are composed of a large proportion of nitroso chlorides, these compounds are unstable and the greater proportion at least are converted upon standing to polymeric or isomeric forms such as dimers of undetermined structure and chloroximes. When mixtures containing allyl type olefins together with other types of olefins, such as thermolytically cracked petroleum fractions, are used, a considerable proportion of the nitroso chloride (or dimers or rearranged derivatives) initially formed may be chlorinated as a result of dissociation of nitrosyl chloride, leading to compounds containing more than one atom of chlorine per molecule. In speaking of addition products in the specification and claims, it will be understood that it is intended to refer to these mixed products before and after conversion of the nitroso halides to polymeric or isomeric forms and before and after limited halogenation by action of the dissociated nitrosyl halide upon the olefin nitroso halides, their polymers and isomers.

When carrying out the present process using a relatively pure allyl type olefin, the desired addition product can be obtained in substantially pure form simply by removing the solvent, if used, and the excess nitrosyl chloride.

When using a complex mixture of hydrocarbons as the starting material, such as a petroleum fraction, it is generally not feasible from a practical standpoint to recover the addition products in good yields in substantially pure form. Hence, when the addition products have been prepared from such mixtures of hydrocarbons, it is generally preferable to employ the addition products in admixture with the hydrocarbons which have not reacted with the nitrosyl chloride. However, where it is desired to recover a relatively pure addition product and the yields obtained are not of critical importance, addition products may be separated from the remainder of the hydrocarbon mixture by the action of selective solvents. The addition products may also be recovered from the complex mixtures by first converting them into compounds having different properties. For example, complex mixtures containing addition products may be treated to replace the halogen contained therein with a radical comprising (i. e. consisting of or containing) a water-solubilizing group, as described in my United States Patent 2,265,993. This is preferably accomplished by treating the complex mixture with an alkali metal sulfite to replace halogen in the addition products with a sulfonate group. The resulting mixed sulfonates are relatively soluble in water and may be separated from the remainder of the mixture contained in an aqueous layer.

The addition products of this invention are valuable initial materials for the production of varied types of compounds. They are especially suited for conversion to agents having surface active properties making them valuable as washing, wetting, cleansing, dispersing, and emulsifying agents. They may be converted to such agents by treatment with alkali metal (including ammonium) sulfites and many other agents which act to introduce a water-solubilizing group into the products in place of halogen contained therein. The treatment of an addition product to replace the chlorine or bromine therein with a radical comprising a water-solubilizing group may be carried out in one or more stages; the first stage of the treatment, which may be the only stage, involving reacting the addition product with a compound containing a cation capable of reacting with a halogen atom contained in the addition product to form a compound with the halogen atom, and a radical which may be a radical comprising a water-solubilizing group or a radical comprising a group capable of being converted to a water-solubilizing group upon further treatment, whereby the cation combines with the halogen of the addition product and the radical of the compound replaces the halogen of the addition product. Processes using the inorganic sulfites referred to above are examples of processes wherein an addition product is reacted with a compound of this type.

The addition products of the invention may also be converted to products adapted for uses other than as surface active agents. For example they may be reduced or aminated to form higher amines, valuable, for example, in the flotation industry; hydrolyzed to form mixtures of nitrogen- and oxygen-containing chemicals; or condensed with an aromatic compound such as benzene or phenol, preferably with the aid of a Friedel-Crafts condensation catalyst such as aluminum chloride and zinc chloride, to form nitrogen- and oxygen-containing materials having aliphatic and aromatic radicals.

From the foregoing it will be seen that, in the manufacture of the addition products from complex hydrocarbon mixtures such as petroleum fractions, a preferred method of separating the addition products from the reaction mixture obtained at the end of the treatment with the nitrosyl halide involves converting the addition products to compounds containing water-solubilizing groups. Since these relatively water-soluble compounds possess surface active properties, ordinarily they would be employed as such although they could be converted to other compounds if desired.

The separation of the addition product from complex mixtures can also be accomplished by adding concentrated sulfuric acid to the reaction mixtures obtained after the treatment with the nitrosyl halide. In this case also the addition products undergo a chemical change and are not recovered from the mixtures as such.

In order that the invention may be understood more fully, reference should be had to the following examples in which are disclosed typical processes and products of the invention. It will be understood that the examples are given for illustrative purposes only and are not intended as limitations of the invention. The parts in the examples are by weight.

*Example 1*

100 parts of a mixture of allyl type olefins consisting largely of dodecene-1 and tetradecene-1, together with small amounts of other olefins, and secured by the dehydration of alcohols obtained by hydrogenation of the fatty acids from cocoanut oil, were mixed at about 0° C. with 96 parts of liquid nitrosyl chloride. The blue-green color characteristic of the nitroso chloride developed slowly. After 5 hours the remaining nitrosyl chloride was removed by passing a stream of dry air through the mixture. The mixed addition product of dodecene-1 and tetradecene-1 remained in the reaction vessel.

*Example 2*

1,000 parts of a mixture of allyl type olefins consisting largely of hexadecene-1 and octadecene-1, and secured by the dehydration of alcohols obtained by the catalytic hydrogenation of tallow, were dissolved in 2,500 parts of chloroform at about 25° C. 725 parts of nitrosyl chloride vapor were passed into this solution over a period of 6 hours. The chloroform and excess nitrosyl chloride were evaporated from the reaction mixture leaving the blue-green nitrosyl chloride-olefin addition product of hexadecene-1 and octadecene-1.

*Example 3*

500 parts of cetene-1 secured by destructive distillation of spermaceti were placed at room temperature in a long glass tube, closed at one end, suspended in a vertical position and 360 parts of gaseous nitrosyl chloride were introduced over a period of 5½ hours. The mixture was allowed to stand overnight (about 18 hours) after which excess nitrosyl chloride was removed by passing a stream of dry nitrogen into the tube near its base for several minutes. The characteristic blue nitrosyl chloride addition product was thus secured free of dissolved nitrosyl chloride. Part of the addition product consisted of a white solid melting at 94° C.

*Example 4*

An allyl type olefin-containing hydrocarbon fraction, boiling point 125° to 175° C. at 10 mm. pressure (corresponding to about 270° to about 325° C. at atmospheric pressure), was cut from the cracking product secured by operating a liquid phase cracking operation on paraffin wax at one atmosphere pressure and a boiler temperature of 403° to 425° C. Two-hundred parts of this fraction, having an olefin content of 48 per cent as indicated by bromine number, were placed in a round-bottom reaction vessel fitted with a stirrer. The vessel was immersed in a bath maintained at 35° C., and 70 parts nitrosyl chloride vapor were passed in, over a period of 5 hours.

After standing for 4 hours more the excess nitrosyl chloride was removed by blowing with a stream of dry air. The addition product together with the unattacked non-olefinic hydrocarbons remained in the vessel. The final reaction mixture contained substantially no unreacted olefins.

*Example 5*

Pennsylvania crude petroleum was topped to 240° C. at 50 mm. pressure. 26,950 parts of the topped crude were cracked in the liquid phase at one atmosphere pressure and a boiler temperature of 375° to 420° C. The low-boiling fractions were separated from the cracked distillate up to 200° C. at one atmosphere. 9,000 parts of an allyl type olefin-containing hydrocarbon mixture were secured boiling between 200° C. at one atmosphere, and 250° C. at 50 mm. pressure (corresponding to 200° to about 355° C. at atmospheric pressure). 2,155 parts of this product were indicated to be olefins by bromine addition number. The 9,000 parts of this fraction were placed in a large glass reactor provided with an agitator and glass cooling coils. Temperature was maintained near 40° C. throughout the course of the reaction. Nitrosyl chloride vapor was passed into the solution, through a spray nozzle placed near the base of the reaction vessel, over a period of 4.5 hours. The rate of flow was gradually decreased during this period so that the initial rate was about 5 times the final rate. A total of 1,577 parts of nitrosyl chloride vapor was passed into the flask during this period. After the flow of nitrosyl chloride was discontinued, the mixture was allowed to stand 3 hours. Excess nitrosyl chloride was removed by blowing dry air through the mixture. The product was drained from the reactor and passed through a filter to remove a small quantity of gum which had been formed. The resulting product was a solution of the clear dark-green addition product in the non-olefinic hydrocarbons present, reaction of the olefins with nitrosyl chloride being substantially complete.

*Example 6*

A pure paraffin wax was cracked in the vapor phase using a ¾ inch I. D. x 10 feet steel tube. 194 cc. liquid per hour were introduced. Exit temperature was 547° C. The distillate, containing allyl type hydrocarbons, was divided into two portions, one boiling up to 200° C. at one atmosphere, the other from this point to 300° C. at 10 mm. mercury pressure. 41.9 weight per cent of the charging stock appeared in this higher boiling fraction. 268 parts of this fraction were mixed at 0° C. with 70 parts liquid nitrosyl chloride, agitated and allowed to stand 6 hours. Excess nitrosyl chloride was removed by blowing with dry air. There was secured a solution of the dark-green addition product in the other hydrocarbons.

*Example 7*

A mixture of carbon monoxide and hydrogen consisting of 60 per cent by volume of hydrogen was passed through a 15 mm. tube at one atmosphere and a space velocity of 75 and a temperature of 185° to 190° C. over a catalyst of cobalt supported on kieselguhr. Liquid hydrocarbons were collected and a fraction (boiling point 200° to 300° C. at atmospheric pressure) was separated by distillation from the liquid reaction products. 47 parts of this fraction, which contained considerable proportions of largely normal chain olefins having terminal double bonds, and paraffins, with little or no aromatics or naphthenes, were dissolved in 200 parts of chloroform at 20° C. and a solution of 18 parts nitrosyl chloride in 500 parts of chloroform was added. After standing for 3.5 hours the chloroform and excess nitrosyl chloride were removed, leaving a solution of the desired blue-green addition product in the paraffin hydrocarbons present.

*Example 8*

A portion of wax secured as by-product material from the Fischer-Tropsch hydrogenation process was cracked in the liquid phase at a boiler temperature of 403° to 425° C. and one atmosphere pressure. 250 parts of a resulting allyl type olefinic hydrocarbon fraction boiling at 131° C. to 250° C. at 50 mm. mercury pressure (corresponding to about 230° to about 355° C. at atmospheric pressure) were placed in a vessel provided with a stirrer and surrounded by a bath maintained at 25° C. 140 parts nitrosyl chloride in 5,000 parts chloroform were added dropwise over a period of about 5 hours. The mixture was allowed to stand another 5 hours. Then excess nitrosyl chloride was removed by vaporizing the solvent chloroform. There was secured a clear green solution of the desired addition product.

It will be understood by those skilled in the present art that many variations may be made in the examples within the scope of the invention.

Thus, in place of the allyl type olefins and hydrocarbon mixtures employed as starting materials in the examples, there may be used any of the allyl type olefins or hydrocarbon mixtures of the class hereinbefore defined, especially those specifically mentioned above.

In carrying out the reaction with nitrosyl chloride or nitrosyl bromide, the use of a solvent is of advantage in many cases, particularly where a relatively pure olefin or mixture of olefins is subjected to treatment. The solvents suitable for use in this connection are those in which the reactive hydrocarbons are soluble and which undergo no substantial reaction with nitrosyl chloride or nitrosyl bromide. The preferred solvents are those which have relatively high volatilities so that they may be removed by vaporization with or without vacuum at a temperature below 80° C. The solvents, of course. must be liquid at the reaction temperature and pressure. A solvent decreases the viscosity of the reaction mixture, assists in bringing the nitrosyl halide and the reactive hydrocarbon into reactive contact and, in most cases. also assists in preventing the undesirable evolution of the nitrosyl halide as a gas during the reaction. Further, it appears that solvents catalyze the reaction; i. e., they increase the rate of reaction or reduce the ratio of side reactions to the desired reaction. It will be apparent that a large number of solvents are adapted for use in the reaction. For example, chlorinated solvents. such as chloroform used in several of the above examples. and carbon tetrachloride; low boiling hydrocarbons, such as petroleum ether and benzene: diethyl ether; dioxane; and the like, may be used.

It has been stated previously that addition products in many cases may be separated from the reaction mixtures by the action of selective solvents. It will be understood that the selective solvents used will depend primarily upon the particular hydrocarbon or mixture of hydrocarbons used as starting materials in the process. For example, in order to recover an addition product of nitrosyl chloride with an olefin of relatively high molecular weight, such as cetene-1, where the addition product has been prepared in a solvent medium composed of petroleum hydrocarbons free from olefins, glacial acetic acid may be used. Preferably, the reaction mixture is extracted one or more times with the acetic acid. On boiling off the acetic acid under diminished pressure from the solution obtained, a substantial proportion of the addition product is obtained free from the petroleum hydrocarbons and other constituents of the reaction mixture. Similarly, glacial acetic acid may be used to extract the nitrosyl chloride addition products of olefins derived from petroleum and the like where the addition products have been prepared by treating petroleum type fractions containing olefins in admixture with paraffinic hydrocarbons with nitrosyl chloride, as in a number of the above examples. Two solvents in which the addition product and the other constituents of the reaction mixture have different solubilities may be used in many cases. As an example of such a pair of solvents there may be mentioned petroleum ether and methyl formate. When using this pair they are added to the reaction mixture and the resulting mixture, on being permitted to stand, separates into two layers, an upper petroleum ether layer in which relatively little of the addition product is dissolved, and a lower methyl formate layer containing the bulk of the addition products. The lower layer is recovered and the methyl formate is evaporated off to yield the addition product.

In referring to an addition product of a hydrocarbon having designated characteristics, for example, an olefin, in the claims, it will be understood that addition products of mixed hydrocarbons of the designated type as well as single hydrocarbons are intended, unless otherwise indicated.

Since changes may be made in the processes and products described above without departing from the scope of the invention, it is intended that the above description shall be interpreted as illustrative and not in a limiting sense.

I claim:

1. The addition product of a nitrosyl halide selected from the group consisting of nitrosyl chloride and nitrosyl bromide, and an olefinic hydrocarbon containing at least 12 carbon atoms, not more than one ring system and one aliphatic

linkage, said

linkage being in a —CH₂CH=CH₂ radical.

2. The addition product of a nitrosyl halide selected from the group consisting of nitrosyl chloride and nitrosyl bromide, and an olefinic hydrocarbon containing 12 to 30 carbon atoms, at least 8 of which are in a straight chain, not more than one ring system, and one aliphatic

linkage, said

linkage being in a —CH₂CH=CH₂ radical.

3. The addition product of nitrosyl chloride and an acyclic olefinic hydrocarbon containing 12 to 30 carbon atoms, and having one aliphatic

linkage, which is in a —CH₂CH=CH₂ radical.

4. The addition product of a nitrosyl halide selected from the group consisting of nitrosyl chloride and nitrosyl bromide, and a mixture of olefinic hydrocarbons containing at least 12 carbon atoms, not more than one ring system, and one aliphatic

linkage, at least one of the olefinic hydrocarbon components of said addition product having the

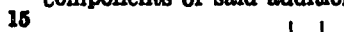

linkage in a —CH₂CH=CH₂ radical.

5. The addition product of nitrosyl chloride and olefinic hydrocarbons contained in a hydrocarbon mixture resulting from thermolytic cracking of a paraffinic petroleum fraction and boiling between 200° C. at atmospheric pressure and 300° C. at 10 mm. absolute pressure, the olefinic hydrocarbon components of said addition product including olefinic hydrocarbons having not more than one ring system and one aliphatic

linkage which is in a —CH₂CH=CH₂ radical.

6. The addition product of nitrosyl chloride and olefinic hydrocarbons contained in a hydrocarbon mixture resulting from the hydrogenation of carbon oxides and boiling between 200° C. at atmospheric pressure and 300° C. at 10 mm. absolute pressure, the olefinic hydrocarbon components of said addition product including acyclic olefins having one aliphatic

linkage which is in a —CH₂CH=CH₂ radical.

7. The addition product of nitrosyl chloride and a straight-chain terminal-double-bond acyclic olefin containing 12 to 30 carbon atoms.

8. The process which comprises reacting one mol of an olefinic hydrocarbon having at least 12 carbon atoms, one aliphatic

linkage and not more than one ring system, said

linkage being in a —CH₂CH=CH₂ radical, with at least one-half mol of a nitrosyl halide selected from the group consisting of nitrosyl chloride and nitrosyl bromide, at a temperature above —20° C. and not exceeding 80° C., whereby an addition product of said olefinic hydrocarbon and said nitrosyl halide is produced.

9. The process which comprises reacting one to four mols of nitrosyl chloride with one mol of an olefinic hydrocarbon having 12 to 30 carbon atoms, of which at least 8 carbon atoms are in a straight chain, and having one aliphatic

linkage and not more than one ring system, said

linkage being in a —CH₂CH=CH₂ radical, at a temperature above —20° C. and not exceeding 80° C., whereby a nitrosyl chloride addition product of said olefinic hydrocarbon is produced.

10. The process which comprises reacting at least one-half mol of nitrosyl chloride with one mol of an acyclic olefinic hydrocarbon having 12 to 30 carbon atoms and one

linkage, said

linkage being in a —CH$_2$CH=CH$_2$ radical, at a temperature above —20° C. and not exceeding 40° C., and recovering a resulting reaction product comprising a nitrosyl chloride addition product of said olefinic hydrocarbon.

11. The process which comprises reacting one mol of an olefinic hydrocarbon having at least 12 carbon atoms, one aliphatic

linkage and not more than one ring system, said

linkage being in a —CH$_2$CH=CH$_2$ radical, with at least one-half mol of a nitrosyl halide selected from the group consisting of nitrosyl chloride and nitrosyl bromide, at a temperature above —20° C. and not exceeding 80° C., whereby an addition product of said olefinic hydrocarbon and said nitrosyl halide is produced, and discontinuing the reaction when the amount of combined halogen in the resulting addition product is equal to one to two atoms of halogen per molecule of said olefinic hydrocarbon.

12. The process which comprises reacting at least one-half mol of nitrosyl chloride with one mol of a mixture of olefinic hydrocarbons having at least 12 carbon atoms, one aliphatic

linkage and not more than one ring system, at least one of said olefinic hydrocarbons containing said

linkage in a —CH$_2$CH=CH$_2$ radical, at a temperature above —20° C. and not exceeding 80° C., and recovering a resulting reaction product comprising a nitrosyl chloride addition product of said olefinic hydrocarbon having a —CH$_2$CH=CH$_2$ radical.

13. The process which comprises reacting two to four mols of nitrosyl chloride with one mol of a mixture of olefinic hydrocarbons having 12 to 30 carbon atoms, one aliphatic

linkage and not more than one ring system, said olefinic hydrocarbon mixture including hydrocarbons in which the

linkage is in a —CH$_2$CH=CH$_2$ radical, at a temperature above —20° C. and not exceeding 40° C., whereby a reaction product comprising nitrosyl chloride addition products of said olefinic hydrocarbons having a —CH$_2$CH=CH$_2$ radical is produced, and discontinuing the reaction when the amount of combined chlorine in the resulting addition product is equal to one to two atoms of chlorine per molecule of olefinic hydrocarbons in said mixture.

14. The process which comprises reacting one mol of a mixture of olefinic hydrocarbons having one aliphatic

linkage and not more than one ring system, said olefinic hydrocarbon mixture forming part of a hydrocarbon mixture boiling between 200° C. at atmospheric pressure and 300° C. at 10 mm. absolute pressure and including hydrocarbons in which the

linkage is in a —CH$_2$CH=CH$_2$ radical, with two to four mols of nitrosyl chloride at a temperature above —20° C. and not exceeding 80° C., whereby a reaction product comprising nitrosyl chloride addition products of said olefinic hydrocarbons having a —CH$_2$CH=CH$_2$ radical is obtained.

15. The process which comprises reacting one mol of a mixture of acyclic olefinic hydrocarbons having one aliphatic

linkage, said olefinic hydrocarbon mixture forming part of a hydrocarbon mixture boiling between 200° C. at atmospheric pressure and 300° C. at 10 mm. absolute pressure and resulting from thermolytic cracking of a paraffinic petroleum fraction and said olefinic hydrocarbon mixture including hydrocarbons in which the

linkage is in a —CH$_2$CH=CH$_2$ radical, with two to four mols of nitrosyl chloride at a temperature above —20° C. and not exceeding 80° C., and recovering a resulting reaction product comprising nitrosyl chloride addition products of said olefinic hydrocarbons having a —CH$_2$CH=CH$_2$ radical.

16. The process which comprises reacting one mol of a mixture of acyclic olefinic hydrocarbons having one aliphatic

linkage, said olefinic hydrocarbon mixture forming part of a hydrocarbon mixture resulting from the hydrogenation of a carbon oxide and boiling between 200° C. at atmospheric pressure and 300° C. at 10 mm. absolute pressure, and said olefinic hydrocarbon mixture including hydrocarbons in which the

linkage is in a —CH$_2$CH=CH$_2$ radical, with two to four mols of nitrosyl chloride at a temperature above —20° C. and not exceeding 80° C., and recovering a resulting reaction product comprising nitrosyl chloride addition products of said olefinic hydrocarbons having a —CH$_2$CH=CH$_2$ radical.

17. The process which comprises reacting at least one-half mol of nitrosyl chloride with one mol of a straight-chain terminal-double-bond acyclic olefin having 12 to 30 carbon atoms, at a temperature above —20° C. and not exceeding 40° C., whereby a nitrosyl chloride addition product of said olefin is produced.

LELAND JAMES BECKHAM.

REFERENCES CITED

The following references are of record in the file of this patent:

Tilden, Jour. Chem. Society (London), vol. 16 (New Series), pp. 554–561 (1877).
Tilden, Jour. Chem. Society (London), vol. 65, pp. 324–335 (1894).
Perrot, Comptes Rendus, vol. 202, pp. 494–495 (1936).